No. 679,829. Patented Aug. 6, 1901.
D. M. CARR.
CORD ADJUSTER FOR ELECTRICAL CONDUCTOR CORDS.
(Application filed Apr. 6, 1901.)
(No Model.)
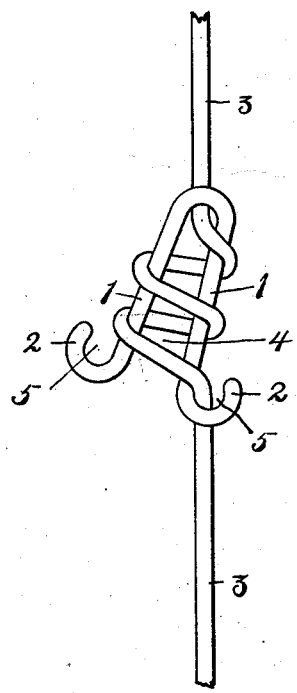
WITNESSES =
F. Bissell.
C. M. Perkins.
INVENTOR =
David M. Carr

UNITED STATES PATENT OFFICE.

DAVID M. CARR, OF ROCHESTER, NEW YORK.

CORD-ADJUSTER FOR ELECTRICAL CONDUCTOR-CORDS.

SPECIFICATION forming part of Letters Patent No. 679,829, dated August 6, 1901.

Application filed April 6, 1901. Serial No. 54,619. (No model.)

*To all whom it may concern:*

Be it known that I, DAVID M. CARR, a citizen of the United States, and a resident of Rochester, in the county of Monroe and State of New York, have invented certain new and useful Improvements in Cord-Adjusters for Electrical Conductor-Cords, of which the following is a specification.

This invention relates to a cord-adjuster for electrical conductor-cords. Its object is to provide an efficient, cheap, and easily-operated means of shortening or lengthening electrical cord conductors; and it consists in the apparatus hereinafter described and claimed.

The drawing shows one of my devices in operative arrangement.

The device consists of a piece of suitable material having two united arms 1 1, separated by a slot 4, and on either arm a portion 2, having a slot 5 opening in a direction opposite, or substantially so, to that of the slot 4.

In the example of my invention herein described and shown it consists of a sheet-metal strip or wire formed or bent into substantially a U shape, thus producing the united arms 1 1 and the slot 4 and having on each free end of the main U a shorter recurved U-shaped portion 2, thus producing the slot 5, opening in a backward direction with reference to the slot 4. The width of the slot between the interior sides of the main U-shaped portion is wide enough to permit a cord 3 of the desired size to be inserted and to rest in the bottom of the U, while slots 5 of the recurved ends 2 are also of a size to contain said cord. The sides of said main U-shaped portion may widen, if desired, or may be parallel. The cord 3 is first inserted so as to lie in the bottom of the slot 4, and is then wound around outside of the arms 1 1 of said main U-shaped portion to the extent necessary to produce the required shortening. The cord is then laid in the slot 5 of one of the recurved portions 2, and when one end of the cord is properly supported and the other end bears a weight, such as that of an incandescent lamp or of a switchboard-cord weight, the cord will retain its position upon the adjuster. If it is desired to lengthen the cord, it is lifted out of one of the slots 5 and is uncoiled from around the adjuster to the desired extent, and the cord is again laid in one or the other of said recurved portions. If a half-turn of said cord is sufficient to lengthen or shorten it to the desired extent, the cord is merely taken from one of the slots 5 and allowed to rest in the other slot 5. It is obvious that if the adjuster is made of round wire or of sheet metal with rounded edges there is no tendency to cut the cord nor to squeeze it unduly, so as to create wear.

It will be noticed that the form of the hooks in which the cord lies in my device is such as not to produce any biting edge or biting effect upon the cord and that in the use of the device sharp turns of said cord and loose loops thereof do not exist, and, further, that the cord in its different positions upon the adjuster is firmly held thereon when the cord is suspended and a weight, even though a light one, is placed upon the portion below the adjuster.

What I claim is—

1. A cord-adjuster consisting of a U-shaped portion having recurved hooks on its ends, substantially as described.

2. A cord-adjuster consisting of two united arms separated by a slot open at one end and a portion on either arm having a slot opening backward with relation to the first-mentioned slot, substantially as described.

DAVID M. CARR.

Witnesses:
F. BISSELL,
C. M. PERKINS.